United States Patent
Homma

(10) Patent No.: US 8,678,675 B2
(45) Date of Patent: Mar. 25, 2014

(54) MANUFACTURING APPARATUS FOR PROTECTION SLEEVE

(71) Applicant: Sumitomo Electric Industries, Ltd., Osaka (JP)

(72) Inventor: Toshihiko Homma, Yokohama (JP)

(73) Assignee: Sumitomo Electric Industries, Ltd., Osaka (JP)

(*) Notice: Subject to any disclaimer, the term of this patent is extended or adjusted under 35 U.S.C. 154(b) by 0 days.

(21) Appl. No.: 13/644,583

(22) Filed: Oct. 4, 2012

(65) Prior Publication Data

US 2013/0025794 A1 Jan. 31, 2013

Related U.S. Application Data

(62) Division of application No. 12/525,985, filed as application No. PCT/JP2008/065134 on Aug. 26, 2008, now Pat. No. 8,556,525.

(30) Foreign Application Priority Data

Sep. 7, 2007 (JP) .................................. 2007-232839

(51) Int. Cl.
*G02B 6/255* (2006.01)

(52) U.S. Cl.
USPC .......................................................... 385/99

(58) Field of Classification Search
USPC .......................................................... 385/99
See application file for complete search history.

(56) References Cited

U.S. PATENT DOCUMENTS

| | | | |
|---|---|---|---|
| 4,350,867 A * | 9/1982 | Kinoshita et al. | 219/121.63 |
| 4,509,820 A | 4/1985 | Murata et al. | |
| 5,009,474 A | 4/1991 | Wurmser et al. | |
| 5,731,051 A | 3/1998 | Fahey et al. | |
| 5,770,132 A * | 6/1998 | Yamamura et al. | 264/1.25 |

(Continued)

FOREIGN PATENT DOCUMENTS

| | | |
|---|---|---|
| CN | 1163772 C | 8/2004 |
| DE | 3838075 | 2/1990 |

(Continued)

OTHER PUBLICATIONS

Notification of the First Office Action of the corresponding Chinese Application No. 200880004473.1, dated Mar. 2, 2011.

(Continued)

*Primary Examiner* — Uyen Chau N Le
*Assistant Examiner* — Hoang Tran
(74) *Attorney, Agent, or Firm* — Global IP Counselors, LLP

(57) ABSTRACT

A protection sleeve includes a heat shrinkable tube and an adhesive tube and a reinforcing rod housed inside the heat shrinkable tube. The heat shrinkable tube, the adhesive tube, and the reinforcing rod are adhered together in a section spanning across a lengthwise section of the heat shrinkable tube. A protection sleeve manufacturing apparatus includes a jig for securing protection sleeves and a heating device. The jig is contrived to hold a plurality of protection sleeves (each including a heat shrinkable tube, an adhesive tube and a reinforcing rod housed inside the heat shrinkable tube) in a parallel arrangement with spaces in-between. The heating device includes a plurality of hot air vents, means for setting a first distance between the jig and the hot air vents, and means for setting the jig and the hot air vents to a second distance that is closer than the first distance.

10 Claims, 6 Drawing Sheets

(56) References Cited

U.S. PATENT DOCUMENTS

| | | | |
|---|---|---|---|
| 6,437,299 B1 | 8/2002 | Watanabe et al. | |
| 6,518,551 B2 | 2/2003 | Watanabe et al. | |
| 2004/0247261 A1* | 12/2004 | Sato | 385/99 |
| 2005/0006029 A1* | 1/2005 | Suzuki et al. | 156/584 |

FOREIGN PATENT DOCUMENTS

| | | |
|---|---|---|
| JP | H01-235908 A | 9/1989 |
| JP | H07-128539 A | 5/1995 |
| JP | H09-113751 A | 5/1997 |
| JP | H11-052163 A | 2/1999 |
| JP | 2001-013355 A | 1/2001 |
| JP | 2002-347721 A | 12/2002 |
| JP | 2003-029076 A | 1/2003 |

OTHER PUBLICATIONS

Extended European Search Report of the corresponding European Application No. 08829056.4, dated Feb. 13, 2012.

Examination report of the corresponding European Application No. 08829056.4, dated Jun. 29, 2012.

* cited by examiner

MANUFACTURING APPARATUS FOR PROTECTION SLEEVE

CROSS-REFERENCE TO RELATED APPLICATIONS

This application is a divisional application of and claims priority to U.S. patent application Ser. No. 12/525,985 filed on Aug. 5, 2009, which claims priority to under 35 U.S.C. §365 to International Patent Application No. PCT/JP2008/065134 filed Aug. 26, 2008, which further claims priority to Japanese Patent Application No. 2007-232839, filed on Sep. 7, 2007. The entire disclosures of U.S. patent application Ser. No. 12/525,985, International Patent Application No. PCT/JP2008/065134 and Japanese Patent Application No. 2007-232839 are hereby incorporated herein by reference in their entirety.

FIELD OF THE INVENTION

The present invention relates to a sleeve for protecting a fusion spliced portion of an optical fiber and a manufacturing apparatus and a manufacturing method for the sleeve.

BACKGROUND OF THE INVENTION

When optical fibers are fusion spliced, protective coating at the connecting end portions of the optical fibers is removed to expose glass fiber and the end portions of the glass fiber are fused together. Since the portion where the protective coating has been removed has a low mechanical strength, it is reinforced with a protection sleeve covering it. The protection sleeve has a heat shrinkable tube (outer tube) that can shrink in a radial direction when heated and a reinforcing rod and an adhesive tube (inner tube) made of a hot-melt adhesive resin housed inside the outer tube.

FIG. 7A is a schematic view of a protection sleeve 1 disclosed in Japanese Laid-open Patent Publication No. 2002-347721 (Patent Document 1). The protection sleeve 1 has a heat shrink outer tube 2 and a hot-melt inner tube 3 and a reinforcing rod 4 housed inside the outer tube 2. A portion 5 at each of both ends of the outer tube 2 is heat-shrunk so as to hold the reinforcing rod 4 and the inner tube 3 is held by friction.

FIG. 7B is a schematic view illustrating a manufacturing method for the protection sleeve 1. A plurality of the outer tube 2 each of which accommodates the inner tube 3 and the reinforcing rod 4 are carried successively at a prescribed speed by a belt conveyer 7 in a state where the reinforcing rod 4 is positioned downward. The end portions of the outer tube 2 is selectively heated by a heating element 6 which is arranged in a position along the path through which the protection sleeve 1 is carried, whereby the outer tube heat shrinks at the end portions and the reinforcing rod 4 is secured in the outer tube 2.

FIG. 7C is a schematic view illustrating a configuration in which the protection sleeve 1 is used. One of the optical fibers 8a and 8b that are to be fusion spliced together is first inserted into the protection sleeve 1. The protective coating on the end portions of the optical fibers 8a and 8b are removed and the optical fibers 8a and 8b are fusion spliced at the mating ends 9b of the exposed bare fibers 9a. The protection sleeve 1 is then arranged to a position where the fusion spliced portion locates at the middle position of the sleeve such that it covers the bare fibers 9a and the adjacent fiber coating. Next, the entire protection sleeve 1 is heated for a prescribed amount of time in order to shrink the outer tube 2 and to melt the inner tube 3 such that it fills the space inside the outer tube 2. Afterwards, the inner tube 3 hardens and the protection sleeve and optical fiber become secured together as an integral unit, thereby reinforcing and protecting the fusion spliced portion of the optical fiber.

With the protection sleeve 1, if the heating amount is unstable and the shrinkage of the end portions is insufficient, then the reinforcing rod will easily become dislodged. Also, since both ends are shrunk in advance on the side where the reinforcing rod is located, the shrinkage rate on the side where the reinforcing rod is located will become smaller than the shrinkage rate of the side where the optical fiber is located when the protection sleeve covering the fusion spliced portion of the optical fiber is heated and the optical fiber is possibly to be bend.

Japanese Laid-open Patent Publication No. 11-52163 (Patent Document 2) discloses a protection sleeve which is heat-shrunk at an intermediate portion thereof so as to hold a reinforcing rod. With this protection sleeve, the bending of the optical fiber that occurs with the protection sleeve 1 can be avoided, but the holding force obtained with respect to the reinforcing rod is weak and the reinforcing rod can easily become dislodged.

SUMMARY OF THE INVENTION

Object the Invention is to Achieve

The object of the present invention is to provide a protection sleeve that does not cause an optical fiber to bend and reliably prevents a reinforcing rod from becoming dislodged, and to provide a manufacturing apparatus and manufacturing method for the protection sleeve.

Means of Achieving the Object

In order to achieve the object, the present invention provides a protection sleeve that includes a heat shrinkable tube having an adhesive tube and a reinforcing rod housed therewithin, the heat shrinkable tube, the adhesive tube, and the reinforcing rod being adhered together in a lengthwise section of the heat shrinkable tube. The lengthwise section preferably includes a middle portion of the protection sleeve and has a length that is equal to or larger than ¼ and smaller than or equal to ⅖ of the length of the protection sleeve. The reinforcing rod is preferably a glass rod or ceramic rod having a flat surface.

Another aspect of the invention provides a protection sleeve manufacturing apparatus including a jig contrived to secure a protection sleeve and a heating device. The jig is contrived to hold a plurality of protection sleeves—each of which includes a heat shrinkable tube and a hot-melt adhesive tube and a reinforcing rod housed inside the heat shrinkable tube—in a parallel arrangement with spaces in-between. The heating device includes a plurality of hot air vents, a means of setting a distance between the jig and the hot air vents to a first distance at which the heat shrinkable tubes will be provisionally shrunk such that the adhesive tubes and the reinforcing rods are provisionally held inside the heat shrinkable tubes, and a means of setting the jig and the hot air vents to a second distance that is closer than the first distance and at which the heat shrinkable tubes, the adhesive tubes and the reinforcing rods will be adhered in a localized manner only at a middle portion of the protection sleeves.

Another aspect of the invention provides a protection sleeve manufacturing method in which (1) a plurality of heat shrinkable tubes each having a hot melt adhesive tube and a reinforcing rod housed there-within are held securely on a heating device having a plurality of hot air vents such that the heat shrinkable tubes are in a parallel arrangement with spaces in-between and the reinforcing rods are positioned downward, (2) provisionally shrinking the heat shrinkable tubes by executing a preliminary heating at a first distance from the hot air vents such that the adhesive tubes and the reinforcing rods are provisionally held, and (3) adhering the heat shrinkable tube, the adhesive tube, and the reinforcing rod at a middle portion of each of the protection sleeves by executing a main heating at a second distance that is closer than the first distance.

BRIEF DESCRIPTION OF THE DRAWINGS

FIG. 3A shows a state before a heat treatment, FIG. 3B shows a state during a preliminary heating, and FIG. 3C shows a state during a main heating.

FIG. 6 shows schematic views for explaining operation of the heating device shown in FIG. 5.

DETAILED DESCRIPTION OF THE INVENTION

Figure 1A:
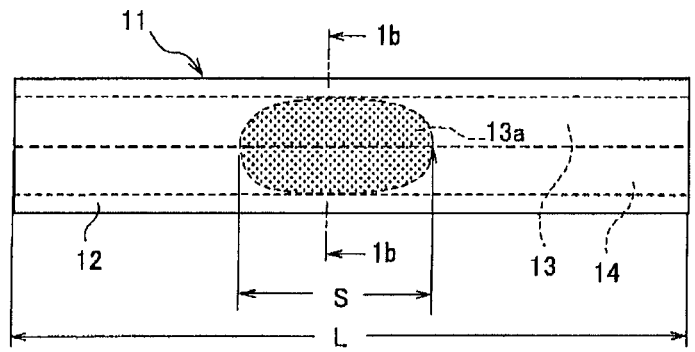
FIG. 1A is a side view of an embodiment of a protection sleeve according to the present invention.

Embodiments of the present invention will now be explained with reference to the drawings. The drawings are provided for the purpose of explaining the invention and are not intended to limit the scope of the invention. In the drawings, parts that are the same are indicated with the same reference numerals in order to avoid redundant explanations. The relative sizes of dimensions are not necessarily depicted accurately in the drawings.

FIG. 1A is a side view of a protection sleeve 11 in accordance with an embodiment of the present invention. The protection sleeve 11 has a transparent heat shrinkable tube 12 (hereinafter called "outer tube") and a transparent adhesive tube 13 (hereinafter called "inner tube") and a reinforcing rod 14 housed inside the tube 12. Heating causes the outer tube to shrink in a radial direction and causes the inner tube to melt and to function as an adhesive and a filler. The reinforcing rod is made of, for example, stainless steel, glass, or ceramic, and functions as a high tensile member. When fusion splicing an optical fiber array, the inner tube 13 inserted into the outer tube 12 is typically elliptical and the reinforcing rod 14 is made of glass or ceramic and has a semicircular or rectangular cross sectional shape such that it has at least one flat surface.

Figure 1B:
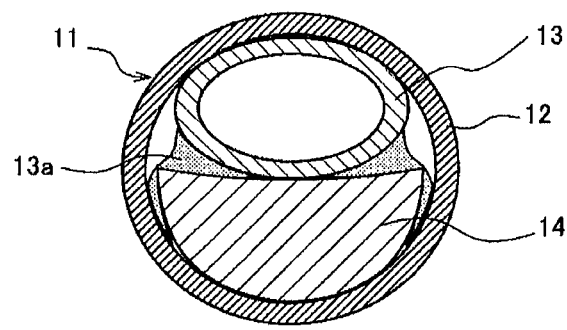
FIG. 1B is a cross sectional view taken along the section line 1b-1b of FIG. 1A.

FIG. 1B is a cross sectional view of the protection sleeve 11 taken along the section line 1b-1b. At a middle portion of the sleeve 11, a portion of a middle section of the inner tube 13 is melted such that the outer tube 12, the inner tube 13, and the reinforcing rod are adhered together as an integral unit. It is not necessary for the molten resin 13a constituting the melted portion of the inner tube 13 to fill the space inside of the outer tube 12 completely. It is sufficient for the molten resin 13a to flow into a gap between the outer tube 12 and the reinforcing rod 14 and a gap between the inner tube 13 and the reinforcing rod 14 such that an adhered state is achieved. Also, even though a portion of the inner tube 13 has been melted, it still retains a sufficient opening for the optical fiber to pass through.

An axial range S corresponding to where the inner tube 13 is adhered is preferably approximately ⅖ or less of the total length L of the protection sleeve 11. It is sufficient for the range S to be ¼ of the length L and preferable for the range S to be ⅓ of length L. Since the outer tube 12 and the inner tube 13 are made of a transparent (natural color) resin material, the state of the adhesion can easily checked from the outside.

Figure 2:
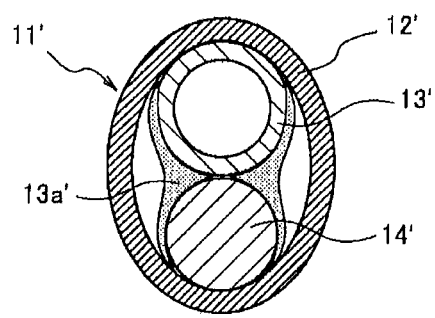
FIG. 2 is a cross sectional view of another embodiment of a protection sleeve according to the present invention.

FIG. 2 is a cross sectional view of a protection sleeve 11' in accordance with another embodiment of the present invention. The protection sleeve 11' is a protection sleeve used for a fusion spliced portion of a single optical fiber. The outer tube 12' is elliptical and the inner tube 13 is circular. The reinforcing rod 14' is normally round and made of stainless steel or other metal material. Similarly to the protection sleeve 11, the outer tube 12', the inner tube 13', and the reinforcing rod 14' are adhered into an integral unit at a middle portion of the protection sleeve 11'.

Figure 3A:
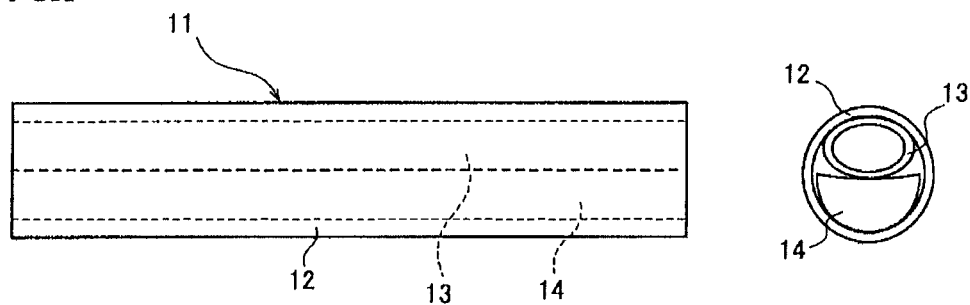
FIGS. 3A, 3B, and 3C are schematic views for explaining a protection sleeve manufacturing method according to the present invention and each has a side view (on left) and a frontal view (on right).
Figure 3B:
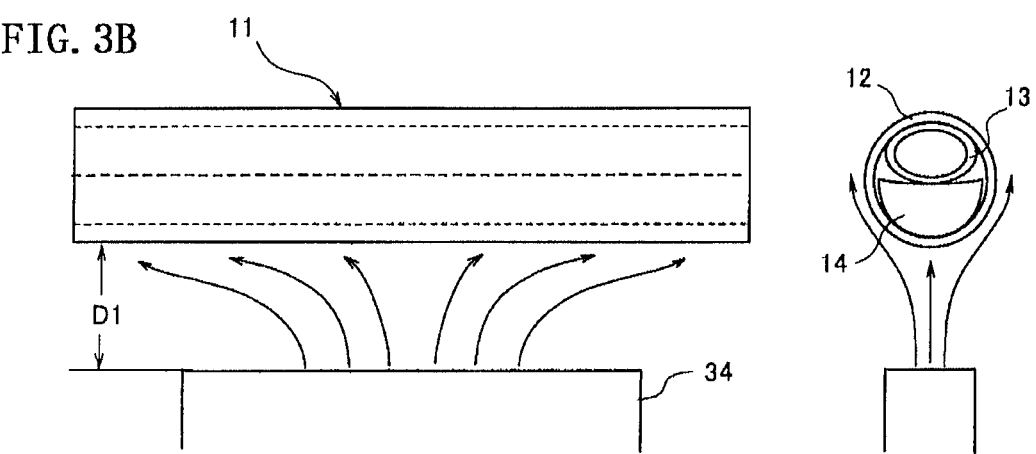
Figure 3C:
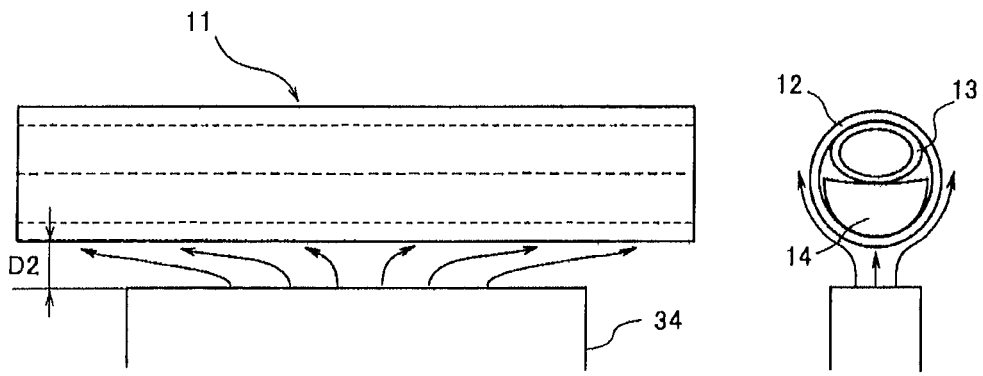

FIGS. 3A, 3B, and 3C show schematic views for explaining a protection sleeve manufacturing method in accordance with the present invention and each has a side view (on left) and a frontal view (on right). FIG. 3A shows a state before a heat treatment. Before the heat treatment is executed, the protection sleeve 11 has an inner tube 13 and a reinforcing rod 14 housed inside an outer tube 12 that has not been shrunk. It is acceptable for the outer tube 12, the inner tube 13, and the reinforcing rod 14 to be cut to the same length in advance before being assembled. It is also acceptable to insert a long inner tube into a long outer tube and truncate the tubes to a prescribed length before inserting a reinforcing rod having a prescribed length. In this state, the inner tube 13 and the reinforcing rod 14 can be easily removed from the outer tube 12.

In the case of a protection sleeve 11 for an eight-core optical fiber ribbon, the outer tube 12 is, for example, made of a soft polyolefin resin (natural color) and has a length of 40 mm, a pre-shrink outside diameter of 4.8 mm, and a post-shrink outside diameter of 4.2 mm. The inner tube 13 is made of an ethylene vinyl acetate resin (natural color) and had an outside diameter of 2.8 mm and a thickness of 0.45 mm. The reinforcing rod 14 is made of, for example, a glass ceramic and has a semi-circular rod shape with an outside diameter of 3.4 mm and a thickness of 1.6 mm.

FIG. 3B shows a state during a preliminary heating. In order to execute the preliminary heating, the prepared protection sleeve 11 is set on a heating device using a jig that will be described later. During the preliminary heating, the protection sleeve 11 is hold such that the reinforcing rod 14 is positioned downward. The heat treatment of the protection sleeve 11 is conducted using hot air. First, the distance between a hot air discharge nozzle 34 and the protection sleeve is set to a first distance D1. The temperature of the hot air is, for example, approximately 130° C. and the hot air is lightly applied to the protection sleeve 11 from underneath for approximately three seconds in a substantially uniform fashion. In this way, the outer tube 12 is slightly shrunk (provisionally shrunk) in an even fashion such that the entire reinforcing rod 14 is provisionally held and will not become dislodged from the outer tube 12.

FIG. 3C shows a state during a main heating. During the main heating, the distance between the hot air discharge nozzle 34 and the protection sleeve 11 is set to a second distance D2 that is closer than the first distance D1. The temperature of the hot air is the same 130° C. and the hot air is applied from underneath for approximately 11 seconds. During the main heat treatment, a middle portion of the outside tube 12 of the protection sleeve 11 shrinks somewhat more than other portions and a middle region of the inner tube 13 melts in a localized fashion. The melted adhesive flows into a gap portion between the outer tube 12 and the reinforcing rod 14 and, afterwards, hardens as the protection sleeve 11 cools, thereby adhering and securing the outer tube 12, the inner tube 13, and the reinforcing rod 14 together only at a middle portion of the protection sleeve 11. Since hot air heating is used for the heat treatment, the adhering and securing can be accomplished without breaking the reinforcing rod even if the reinforcing rod is made of glass or ceramic.

Figure 4A:
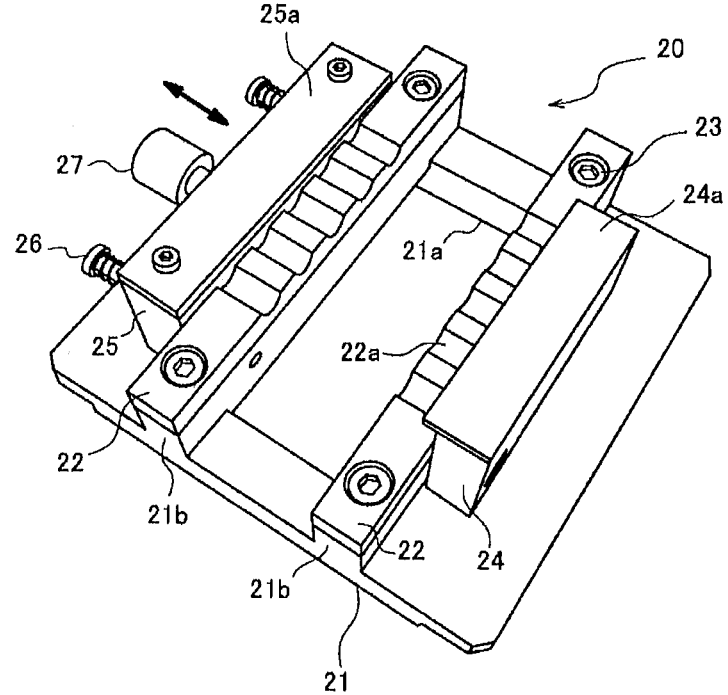
FIG. 4A is a perspective view showing an example of a jig of a protection sleeve manufacturing apparatus according to the present invention.

FIG. 4A is a perspective view showing a jig 20 of a protection sleeve manufacturing apparatus in accordance with the present invention. The jig 20 has a base platform 21, a pair of U-groove members 22 configured for a plurality of protection sleeves to be placed thereupon in a parallel arrangement, a stationary retaining block 24 contrived to press one end of the protection sleeves, and a movable retaining block 25 contrived to press the other end of the protection sleeves. The U-groove members 22 and the retaining blocks 24 and 25 are mounted onto the base platform 21. A rectangular opening 21a configured for a hot air discharge nozzle (described later) to pass through is formed in a middle portion of the base platform 21, and guide blocks 21b configured for the U-groove members to be attached thereto are formed on the base platform 21 on both sides of the opening 21a. The U-groove members 22 each have a plurality of U-grooves 22a (five U-grooves in the example shown in the figure) and are securely mounted to the guide blocks 21b with screw members 23.

The stationary retaining block 24 is arranged closely adjacent to one of the U-groove members 22, and the movable retaining block 25 is arranged closely adjacent to the other U-groove member 22 such that it can be moved in the directions indicated with an arrow. The movable retaining block 25 is spring-loaded toward the U-groove member 22 by a pair of spring members 26 and configured such that it can be moved away from the U-groove member 22 using an operating handle 27. Guide pins (not shown) configured to be inserted into one end portion of each of the holding sleeves 11 are provided on the stationary retaining block 24, and the protection sleeves 11 are placed such that the reinforcing rods are always downward.

Figure 4B:
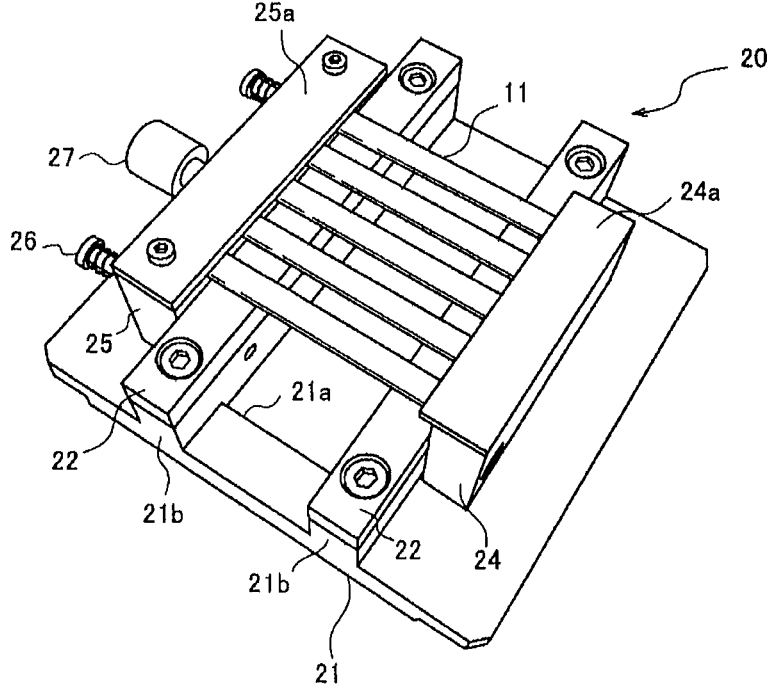
FIG. 4B is a perspective view showing the jig holding protection sleeves.

FIG. 4B is a perspective view of the jig 20 with protection sleeves held therein. A plurality of protection sleeves 11 are placed on the jig 20 in a parallel arrangement with a prescribed spacing in-between and held in a secure fashion. In order to load the protection sleeves 11, the moveable retaining block 25 is moved away from the U-groove member 22 against the spring forces of the spring members 26 and a plurality of protection sleeves 11 is placed between the pair of U-groove members 22. Each of the holding sleeves 11 is rotated such that the reinforcing rod is positioned downward and placed such that one end portion contacts the stationary retaining block 24 and a guide pin enters the inner tube of the protection sleeve 11, thereby positioning the protection sleeve 11.

The movable retaining block 25, which has been moved away from the U-groove member 22, is then released. As a result, the spring members 26 causes the protection sleeves 11 to be pushed toward the stationary retaining block 24 and held securely by being pinched at both ends between the movable retaining block 25 and the stationary retaining bock 24. Upper edge portions 24a and 25a of the stationary retaining block 24 and the movable retaining block 25 protrude slightly toward the U-groove members 22 and press the protection sleeves 11 from above, thereby preventing the protection sleeves 11 from coming out of place in an upward direction.

Figure 5:
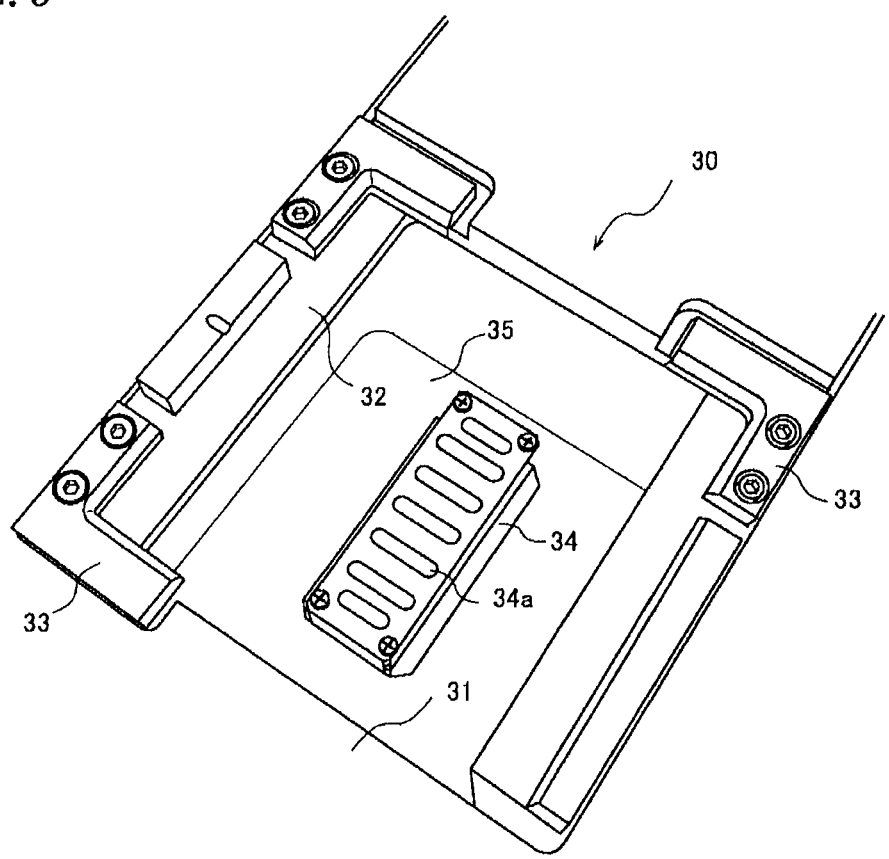
FIG. 5 is a perspective view showing an example of a heating device of a protection sleeve manufacturing apparatus according to the present invention.

FIG. 5 is a perspective view of a heating device 30 of a protection sleeve manufacturing device in accordance with the present invention. The heating device 30 has a jig support frame 32 contrived to support the jig 20 and move the jig 20 up and down and a hot air discharge nozzle 34 contrived to blow hot air against protection sleeves 11 arranged on the jig 20 so as to heat the protection sleeves 11. The jig support frame 32 is arranged such that a portion thereof is exposed from an open side of an upper case 31 of the heating device 30. A positioning member 33 contrived to regulate a horizontal loading position of the jig 20 is provided on an upper surface in a corner portion of the jig support frame. The jig 20 is positioned by the positioning member 33 and the protection sleeves 11 held by the jig 20 are arranged in a prescribed positional relationship with respect to the hot air discharge nozzle 34. The hot air discharge nozzle 34 is securely attached to a nozzle support frame 35 and configured to receive hot air from a hot air supply device (not shown) through a duct or the like and to blow the hot air out from hot air vents 34a provided on an upper end thereof.

The hot air vents 34a of the hot air discharge nozzle 34 are configured to apply hot air to each of the protection sleeves 11. Each of the hot air vents 34a is provided with a comb-shaped flow regulating device (not shown) for adjusting the flow rate of the hot air at each position and is contrived such that it can heat the entire protection sleeve 11 uniformly so as to achieve uniform heat shrinkage.

Figure 6A:
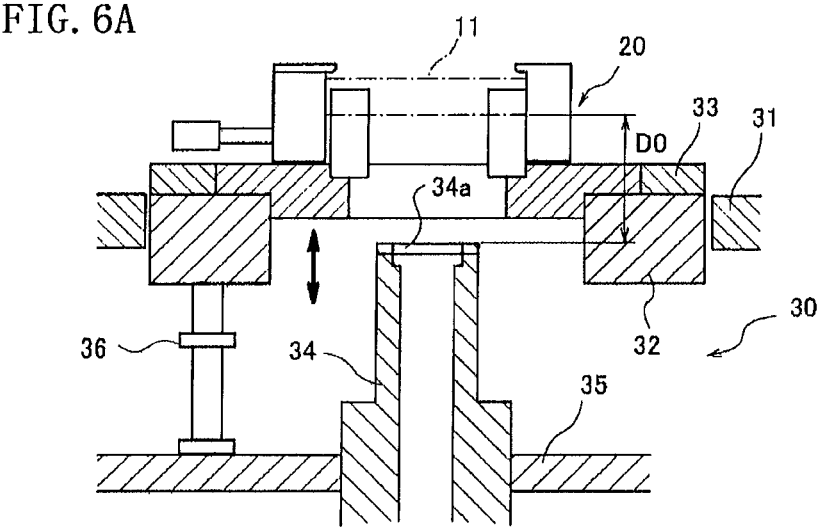
FIG. 6A shows a state before a heat treatment.
Figure 6B:
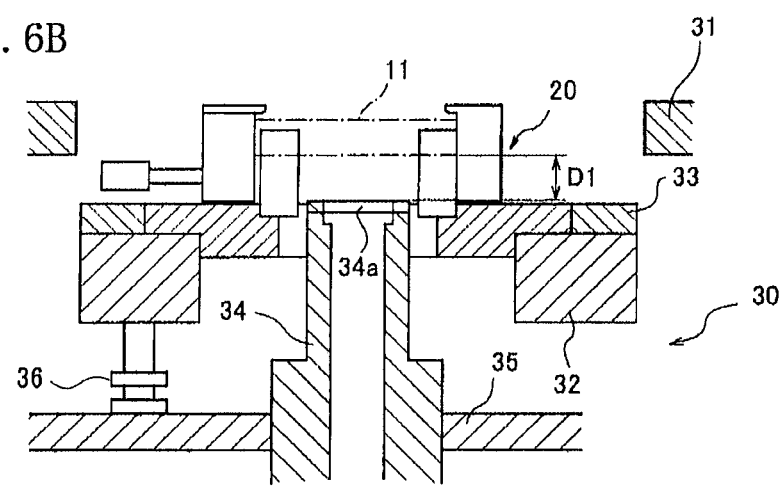
FIG. 6B shows a state during a preliminary heating.
Figure 6C:
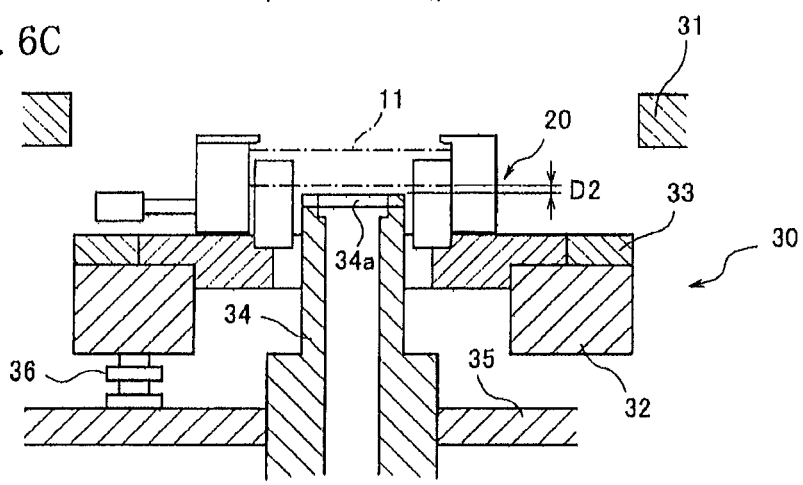
FIG. 6C shows a state during a main heating.
Figure 7A:
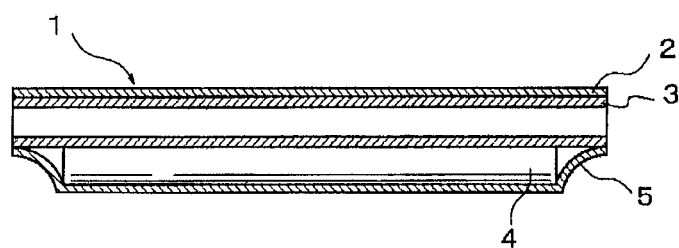
FIGS. 7A, 7B, and 7C are schematic views showing a conventional protection sleeve, a manufacturing method thereof, and a mode of using the protection sleeve.
Figure 7B:
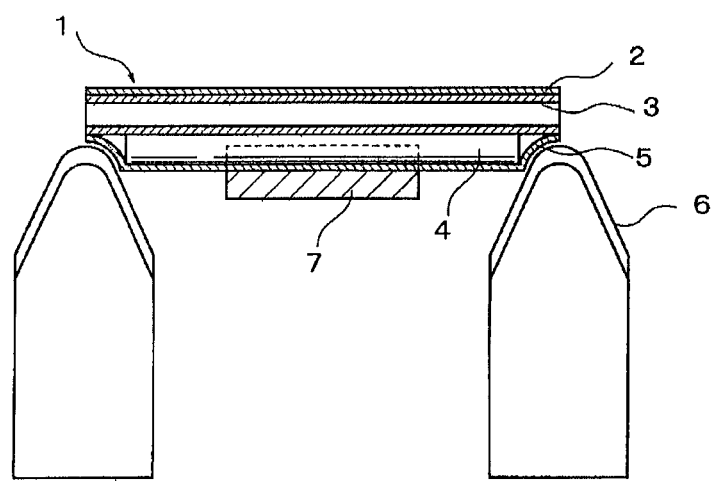
Figure 7C:
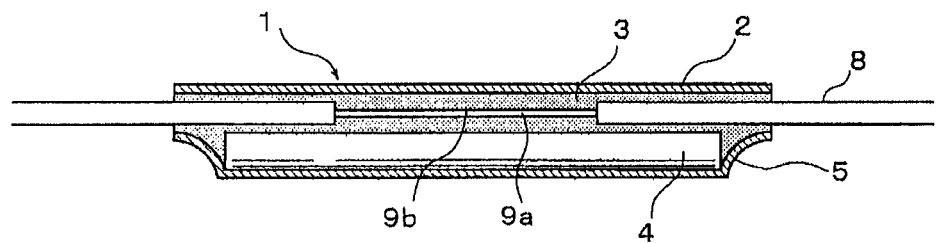

FIGS. 6A, 6B, and 6C are views for explaining the operation of the heating device 30. FIG. 6A shows a state occurring before a heat treatment is executed in which protection sleeves 11 are loaded onto the heat shrinking jig 20 and the jig 20 is placed on the jig support frame 32. The heating device 30 is equipped with an air cylinder 36 as a means of changing/setting a height position of the jig support frame 32 (it is also acceptable to use an electromagnetic drive device instead of an air cylinder 36). The distance between the hot air vents 34 (which are set in fixed positions) and the protection sleeves 11 held on the jig 20 can be set/changed to any desired value during the heating process. Before heating, the jig support frame 32 is exposed through the opening of the upper case 31 of the device and the protection sleeves 11 are positioned far away from the hot air vents 34a (e.g., at a distance D0 of 50 mm or more).

FIG. 6B shows a state during a preliminary heating. For the preliminary heating, the jig support frame 32 is lowered below the surface of the upper case 31 of the device and positioned such that the distance between the hot air vents 34a and the protection sleeves 11 is equal to a first distance D1 (e.g., approximately 10 mm). The protection sleeves 11 are then preliminarily heated in a uniform fashion with hot air at 130° C. for approximately three minutes such that the outer tubes of the protection sleeves 11 are slightly heat-shrunk (provisionally shrunk) over their entire lengths and the inner tubes and reinforcing rods housed inside the outer tubes are held lightly (provisionally held).

FIG. 6C shows a state during a main heating. For the main heating, the jig support frame 32 is lowered even farther below the surface of the upper case 31 of the device and positioned such that the distance between the hot air vents 34a and the protection sleeves 11 is equal to a second distance D2 (e.g., approximately 1.5 mm) that is smaller than the first distance D1. The main heating is then executed by heating the protection sleeves 11 with hot air at, for example, 130° C. for approximately eleven minutes. In the main heating, a middle portion of each of the protection sleeves is heated stronger than in the preliminary heating such that a middle portion of the inner tube melts in a localized fashion. The outer tube, the inner tube, and the reinforcing rod thus become adhered together in a localized fashion only at a middle portion of the protection sleeve.

By using the heating device and heating method described above to manufacture a protection sleeve, a protection sleeve can be manufactured from which the reinforcing rod does not become dislodged and in which bending of an optical fiber does not occur when a reinforcing heat treatment is applied to a fusion splice portion of the optical fiber. Additionally, since the protection sleeve is made such that the outer tube, the inner tube, and the reinforcing rod are securely adhered together in advance only at a middle portion thereof, the inner tube more readily achieves a state in which it melts gradually from the middle portion toward both ends during the reinforcing heat treatment applied to the fusion splice portion of the optical fiber and air inside the sleeve can be pushed out in an effective manner such that air gaps do not remain inside the sleeve.

INDUSTRIAL APPLICABILITY

A protection sleeve in accordance with the present invention can be manufactured using a protection sleeve manufacturing apparatus and protection sleeve manufacturing method in accordance with the present invention and can be used when fusion splicing optical fibers in an optical fiber communication system.

What is claimed is:

1. A manufacturing apparatus for producing a protection sleeve, the protection sleeve including a heat shrinkable tube, a hot-melt adhesive tube and a reinforcing rod housed inside the heat shrinkable tube and is contrived to reinforce a fusion spliced portion of an optical fiber, the manufacturing apparatus comprising:
   a jig contrived to securely hold a plurality of protection sleeves in a parallel arrangement with spaces there-between; and
   a heating device that has a support frame, a hot air discharge nozzle supported on the support frame and a height adjusting mechanism supported on the support frame with the jig being supported on the height adjusting mechanism, the hot air discharge nozzle being configured to blow hot air at the plurality of protection sleeves, the height adjusting mechanism being configured to set a distance between the plurality of protection sleeves and the hot air discharge nozzle to a first distance at which the heat shrinkable tubes of each of the plurality of protection sleeves are provisionally shrunk such that the adhesive tubes and the reinforcing rods are provisionally held inside the heat shrinkable tubes, and configured to set the plurality of protection sleeves and the hot air discharge nozzle to a second distance that is closer than the first distance and at which the heat shrinkable tubes, the adhesive tubes and the reinforcing rods will be adhered in a localized manner only at a middle portion of each of the plurality of protection sleeves.

2. A manufacturing apparatus, comprising:
   a support frame;
   a heating device including a hot air discharge nozzle supported to the support frame, a height adjusting mechanism supported on the support frame; and
   a jig supported on the height adjusting mechanism above the support frame, the jig being configured to support a plurality of protective sleeves such that each of the protective sleeves is spaced apart from adjacent ones of the protective sleeves, the hot air discharge nozzle having a plurality of hot air vents, at least one hot air vent being provided for blowing air at a corresponding one of the protective sleeves, and the height adjusting mechanism being configured to move the jig between a first position and a second position, such that in the first position the plurality of protective sleeves are located a first distance away from the hot air vents and in the second position the plurality of protective sleeves are located a second distance away from the hot air vents, the first distance being greater than the second distance.

3. The manufacturing apparatus according to claim 2, wherein the height adjusting mechanism includes a hydraulic cylinder.

4. The manufacturing apparatus according to claim 2, wherein the jig includes a protective sleeve supporting member.

5. The manufacturing apparatus according to claim 4, wherein the protective sleeve supporting member includes a plurality of protective sleeve supporting grooves.

6. The manufacturing apparatus according to claim 4, wherein the jig includes retaining block located above the protective sleeve supporting member configured to clamp the plurality of protective sleeve in position on the jig.

7. The manufacturing apparatus according to claim 2, wherein the heating device is configured to heat the protective sleeves to a first temperatures with the height adjusting mechanism positioning the plurality of protective sleeves at the first position and is configured to heat the protective sleeves to a second temperatures with the height adjusting mechanism positioning the plurality of protective sleeves at the second position, the first temperature being different than the second temperature.

8. The manufacturing apparatus according to claim 2, wherein each of the plurality of protective sleeves includes a heat shrinkable tube, a hot-melt adhesive tube within the heat shrinkable tube and a reinforcing rod housed inside the heat shrinkable tube, each of the protective sleeves being configured and arranged to reinforce a fusion spliced portion of an optical fiber.

9. The manufacturing apparatus according to claim 1, wherein
   the heat shrinkable tube, the hot-melt adhesive tube and the reinforcing rod are adhered together at a melted portion in a lengthwise section of each of the plurality of protection sleeves, the melted portion formed by the heating of the hot air discharge nozzle with the height adjusting mechanism set at the first distance at which the heat shrinkable are provisionally shrunk.

10. The manufacturing apparatus according to claim 9, wherein
   the protection sleeve has a first length, and the lengthwise section of each of the plurality of protection sleeves has a second length, the second length being equal to or larger than ¼ of the first length, and the second length being smaller than or equal to ⅔ of the first length.

* * * * *